(12) United States Patent
Thal et al.

(10) Patent No.: US 6,752,357 B2
(45) Date of Patent: Jun. 22, 2004

(54) DISTANCE MEASURING USING PASSIVE VISUAL MEANS

(75) Inventors: German von Thal, Aliso Viejo, CA (US); Gregory Allen Roberts, Costa Mesa, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/143,599

(22) Filed: May 10, 2002

(65) Prior Publication Data

US 2003/0209633 A1 Nov. 13, 2003

(51) Int. Cl.$^7$ .............................................. B64D 39/00
(52) U.S. Cl. .................................. 244/135 A; 244/161
(58) Field of Search ......................... 244/135 A, 101, 244/115; 348/117; 340/958

(56) References Cited

U.S. PATENT DOCUMENTS

| | | | | |
|---|---|---|---|---|
| 5,109,345 A | * | 4/1992 | Dabney et al. | 701/226 |
| 5,302,816 A | * | 4/1994 | Tulet | 250/206.2 |
| 5,499,784 A | * | 3/1996 | Crabere et al. | 244/135 A |
| 5,530,650 A | * | 6/1996 | Biferno et al. | 701/300 |
| 6,227,495 B1 | * | 5/2001 | Howard et al. | 244/161 |
| 6,254,035 B1 | * | 7/2001 | Howard et al. | 244/161 |

* cited by examiner

*Primary Examiner*—Peter Poon
*Assistant Examiner*—Timothy D Collins
(74) *Attorney, Agent, or Firm*—Harness Dickey & Pierce P.L.C.

(57) ABSTRACT

An aircraft distance measuring system analyzes images from at least one camera using a known refueling boom length and boom nozzle location to identify a distance between the boom nozzle and a receiving aircraft refueling receptacle. Existing sensors identify boom extended length and angle. The refueling boom and camera connection points on the refueling aircraft provide reference points. Each camera takes a plurality of images of the boom nozzle and the refueling receptacle which are converted to pixel images. A plurality of different aircraft are stored as wire-models in a computer. The computer compares the receiving aircraft image to the wire-model images and a receiving aircraft type having a known refueling receptacle position is selected. The computer continuously uses the camera images and analyzes for position, range and aspect to continuously calculate (i.e., update) the distance between the boom nozzle and the receiving aircraft refueling receptacle.

20 Claims, 5 Drawing Sheets

DISTANCE MEASURING USING PASSIVE VISUAL MEANS

FIELD OF THE INVENTION

The present invention relates in general to distance measuring and more specifically to a system and method using passive visual images to determine varying distances between aircraft during a refueling operation.

BACKGROUND OF THE INVENTION

During air-to-air refueling operations between aircraft, a refueling operator must determine the distance between a refueling boom of the refueling aircraft and the receptacle on the receiving aircraft by visual determination. When the refueling boom is of the common tubular design, damage to the refueling boom or the receiving aircraft can result from inaccurate lineup of the boom nozzle with the receiving aircraft refueling receptacle. Damage as extensive as complete failure of the refueling boom has occurred in these situations.

Some refueling aircraft have one or more cameras installed, the camera images being relayed to viewing screens. Cameras improve the visibility of the refueling boom nozzle and improve the guidance of the boom nozzle to the receiving aircraft refueling receptacle. However, the use of cameras does not provide an accurate measurement of the constantly changing clearance dimension between the boom nozzle and the refueling receptacle. Therefore, the refueling operator must still rely on visual judgment of the clearance dimension, which can result in impacts between the boom nozzle and the receiving aircraft.

Systems are available which enable an aircraft refueling operator to accurately determine the distance between the refueling aircraft and a receiving aircraft. Common systems include laser range detection equipment. This type of equipment is not normally provided on aircraft and is an expensive addition as a backfit item to a refueling aircraft. In addition to the initial expense of these systems, maintenance time and expense is also required to keep the equipment in proper operating condition. Also, the use of laser range systems requires a laser source at or adjacent to the boom nozzle to provide the best indication of the changing clearance dimension to the refueling receptacle and a "hands-free" operation so the refueling operator can operate the refueling boom control equipment. A laser source at the boom nozzle is susceptible to damage if the boom nozzle contacts the receiving aircraft.

It is therefore desirable to provide a low cost, minimum impact system for determining the distance between an aircraft refueling boom and a receiving aircraft refueling receptacle.

SUMMARY OF THE INVENTION

According to a preferred embodiment of the present invention, a distance measuring system for a refueling aircraft is disclosed which comprises at least one refueling boom, at least one camera, and a computer. The refueling boom is provided with a boom nozzle. The boom nozzle has a geometry suitable to matably connect with a receiving aircraft refueling receptacle. Each camera forms a plurality of images of both the boom nozzle and the refueling receptacle. The computer receives each of the images, converts the images to a plurality of pixels and analyzes the images to determine a distance between the boom nozzle and the refueling receptacle. The refueling boom has an attachment end for attachment to the refueling aircraft. The refueling boom attachment end forms a fixed reference point between the attachment end and the refueling aircraft. The attachment point of the camera to the aircraft also forms a camera reference point.

The fixed reference point of the refueling boom and the camera reference point are combined with known data including the length of the refueling boom and its extension angle in order to identify the location in space of the refueling boom nozzle relative to the refueling aircraft. This location in space is assigned coordinates using the pixel image of the boom nozzle.

A database of the computer is pre-loaded with a plurality of wire-frame models of various receiving aircraft (i.e., the aircraft to be refueled). The receiving aircraft type is either (1) manually selected by the equipment operator if known, or (2) automatically selected by the computer because its shape closely matches a receiving aircraft shape of one of the stored wire-frame models in the database of wire-frame models. Each wire-frame model has a plurality of digital coordinates assigned to identify key component locations. Each wire-frame model also contains information sufficient to identify a plurality of aspects, ranges, and locations of the aircraft.

The camera images of the receiving aircraft are digitized into images forming a plurality of pixels. Each of the plurality of pixels can be assigned coordinates. After the receiving aircraft type is selected, the selected database digital image is compared to the digitized camera image. The computer uses the data from the wire-frame model to identify an initial location, range, and aspect of the receiving aircraft. Once the initial location, range, and aspect are determined, the computer enters into a tracking mode which performs fast updates to the location, range, and aspect from further camera images. Each receiving aircraft position change is calculated by a change in pixel coordinates from each preceding camera image.

For each selected aircraft type, the refueling receptacle geometry and location coordinates are known. The spatial location of the receiving aircraft refueling receptacle is continuously updated and compared to the known boom nozzle location. A resulting distance between the boom nozzle and the receiving aircraft refueling receptacle is initially calculated and continuously recalculated until docking occurs.

Some refueling aircraft presently provide at least one camera to assist in the refueling operation and to assist the refueling boom operator in positioning the refueling boom relative to the receiving aircraft. If an analog type camera is employed on the refueling aircraft, the analog images from the camera need to be digitized. If one or more digital cameras are installed on the refueling aircraft, the digital images can be directly used by the computer.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
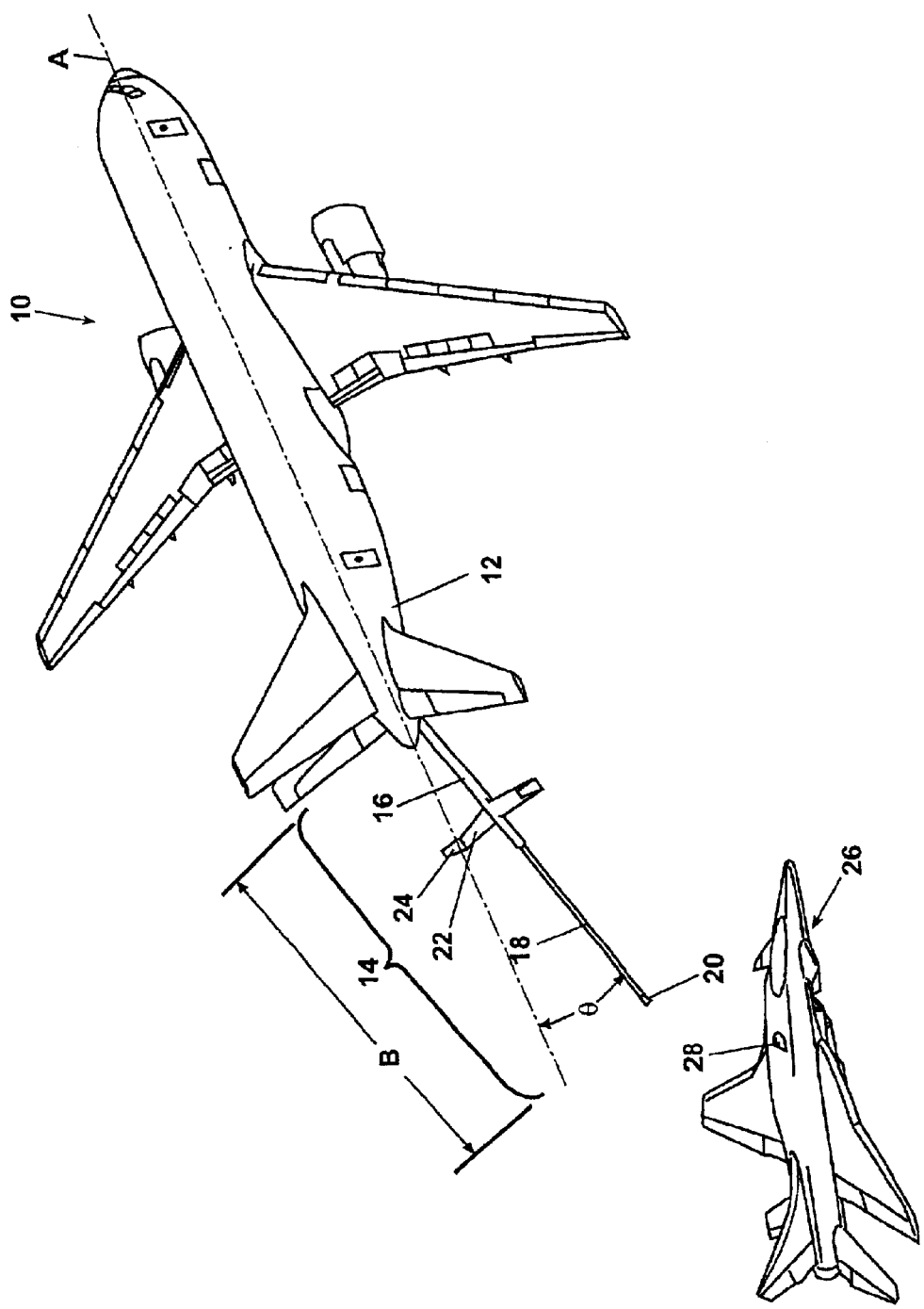
FIG. 1 is a perspective view of a refueling aircraft having a refueling boom adjacent to a receiving aircraft.

Referring to FIG. 1, a refueling aircraft 10 is shown which is typical of the design of refueling aircraft in present day use. From an aft section 12 of the refueling aircraft 10, a refueling boom 14 is extended. The refueling boom 14 comprises a boom fixed tube 16 and a boom extendable tube 18. A boom nozzle 20 is disposed at a distal end of the boom extendable tube 18 which connects to and transfers fuel to a receiving aircraft 26. The refueling boom 14 can be steered toward the receiving aircraft 26 using a plurality of flight control surfaces, including at least one aileron 22 and at least one flight control rudder 24.

The refueling boom 14 normally forms an angle θ from the refueling aircraft centerline A as shown. The refueling boom 14 has a refueling boom length B varying between a partially and a fully extended position of the boom nozzle 20. The refueling boom length B varies typically between about 12.2 meters to about 14.2 meters (40–50 ft.). At this refueling boom length, an operator (not shown) for the refueling boom 14 can have difficulty seeing the exact location in space of the boom nozzle 20.

The receiving aircraft 26 has a refueling receptacle 28 as shown. The refueling receptacle 28 is positionable in several locations depending upon the type of the receiving aircraft 26. In operation, the refueling operator will steer the refueling boom 14 to position the boom nozzle 20 in an approximate location of the refueling receptacle 28 of the receiving aircraft 26. It is common that several attempts are required to achieve docking lock between the boom nozzle 20 and the refueling receptacle 28. This can result in damage to either the refueling boom 14 or the receiving aircraft 26.

Figure 2:
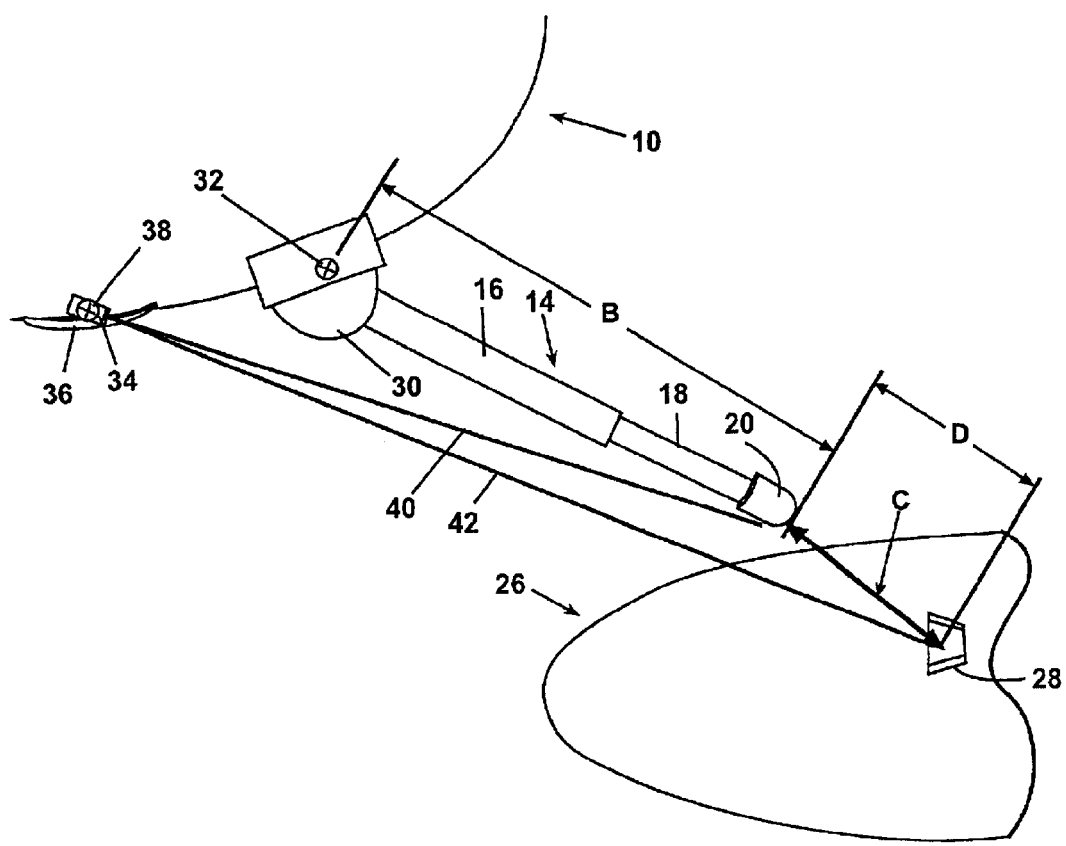
FIG. 2 is a perspective view of both a refueling and a receiving aircraft showing the separation distance between the refueling boom and the receiving aircraft.

Referring now to FIG. 2, one preferred embodiment for the refueling boom 14 is shown in greater detail. The boom fixed tube 16 of the refueling boom 14 has a boom fixed end 30 which is connectable to the refueling aircraft 10 allowing the refueling boom to rotate both up and down and side to side. The connection location formed between the boom fixed end 30 and the refueling aircraft 10 forms a boom reference point 32. At least one camera 34 is disposed on a camera mount 36 which is connectably attached to the refueling aircraft 10. Each camera 34 on its camera mount 36 forms a camera reference point 38. Each camera 34 is positioned to receive an image of the boom nozzle 20 on a nozzle line-of-sight 40. Each camera 34 is also positioned to receive an image of the refueling receptacle 28 on a refueling receptacle line-of-sight 42. Each camera 34 is preferably selected as a digital camera to provide digital pixel images directly from the camera 34.

As the receiving aircraft 26 approaches the refueling aircraft 10, a direct path clearance identified as arrow "C" will result between the refueling boom nozzle 20 and the refueling receptacle 28. A variable separation distance D between the boom nozzle 20 and the refueling receptacle 28 is calculated by the distance measuring system of the present invention.

Some common refueling aircraft currently provide one or more cameras, similarly located as required for the camera 34, to assist in refueling operations. These cameras are typically of an analog design, creating analog images. The analog images are relayed to receiving terminals for the boom operator to view. Images from an existing analog camera will therefore need to be digitized to be communicated to the distance measuring system of the present invention. A reference point similar to the camera reference point 38 for each existing analog camera is also required to be determined and loaded into the computer database. A program known in the art is pre-loaded into the computer and used to digitize the analog images.

Figure 3:
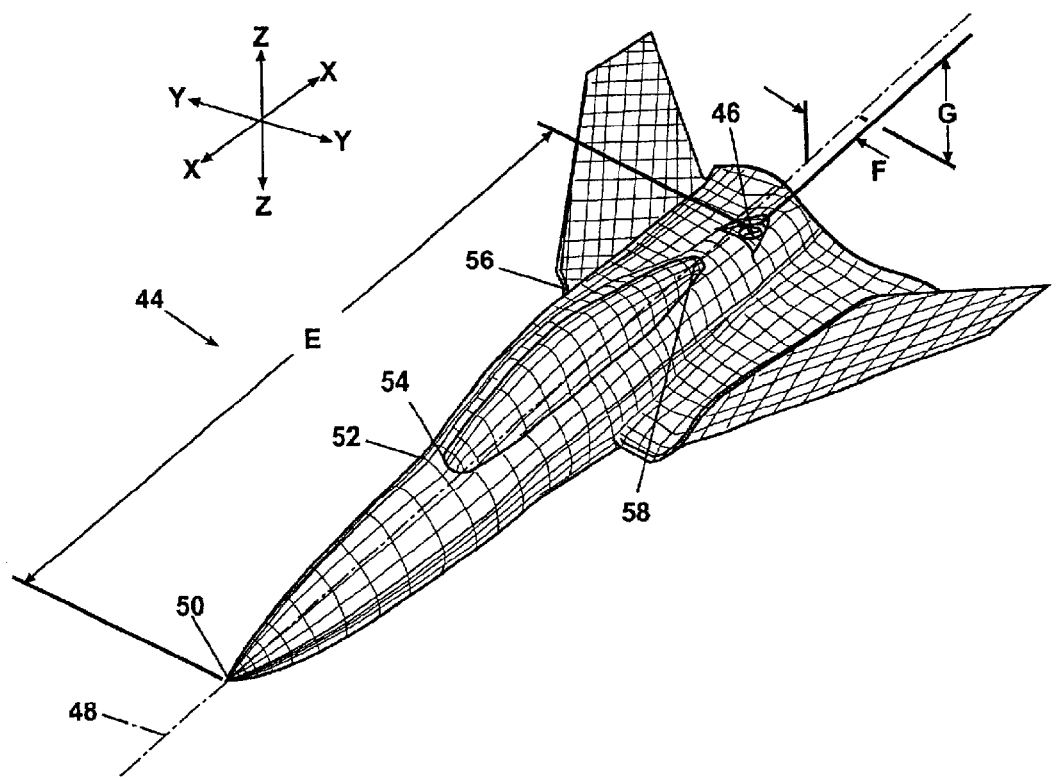
FIG. 3 is a perspective view of a three-dimensional wire-model of an exemplary receiving aircraft.

Referring to FIG. 3, an exemplary receiving aircraft wire-model 44 is shown. According to a preferred embodiment of the present invention, as the receiving aircraft 26 (shown in FIG. 1) approaches the refueling aircraft 10, each camera 34 of the refueling aircraft 10 receives an image of the receiving aircraft 26. A computer (shown in FIG. 5) is previously loaded with a plurality of wire-model images of aircraft which can be refueled by the refueling aircraft 10. As the receiving aircraft 26 approaches, the computer database is queried for a model-based visual match between the image of the receiving aircraft 26 and its closest matching receiving aircraft wire-model 44. The computer compares the image of the receiving aircraft 26 to each of the wire-models in the database and selects a closest matching wire-model. Once the receiving aircraft wire-model is selected, wire-model data such as the location of the refueling receptacle 46 is identified. The refueling receptacle 46 location is identified in three-dimensional coordinates including an exemplary receptacle fore/aft spacing E, a receptacle side-to-side spacing F, and a receptacle height G. The receptacle side-to-side spacing F and the receptacle height G are determined in this exemplary embodiment relative to the wire-model centerline 48.

FIG. 3 also shows a plurality of exemplary reference points which the receiving aircraft wire-model 44 can use to distinguish a receiving aircraft type. A nose reference point 50, a transition reference point 52, a dome reference point 54, a wing interface reference point 56 and an aft dome reference point 58 are shown. Coordinates from the camera image, such as from an X, Y, Z coordinate system, can be assigned to each or all of the reference points of the receiving aircraft wire-model 44. From the coordinates and using the wire-frame model 44 having the closest shape match to the receiving aircraft 26, an initial aspect, range and location of the receiving aircraft 26 are calculated.

Each of the receiving aircraft wire-models 44 available in the computer database are also provided with a plurality of possible aspects, ranges, and locations of the receiving aircraft 26. Once the aircraft type is identified, the passive distance measuring system of the present invention uses a correlation process in a pyramid approach to determine the variables of location, aspect and range of the receiving aircraft. As each camera image changes, both the coordinates assigned to each pixel and the number of pixels for each reference point change. The coordinate change and the number of pixels of each reference point are compared to the plurality of stored images of the receiving aircraft wire-models 44 to determine the aspect and range of the receiving aircraft. If more than one camera 34 is installed, the computer can be programmed to select the image from one camera 34 for analysis, or the images from each camera 34 can be analyzed. Once the location, range, and aspect are determined, the passive distance measuring system of the present invention enters into a tracking mode which performs fast updates to the location, range, and aspect using the camera 34 images. The fast updates provide the boom operator with the continuously changing distance D (shown in FIG. 2) between the refueling receptacle 46 of the receiving aircraft 26 and the boom nozzle 20 of the refueling boom 14.

Figure 4:
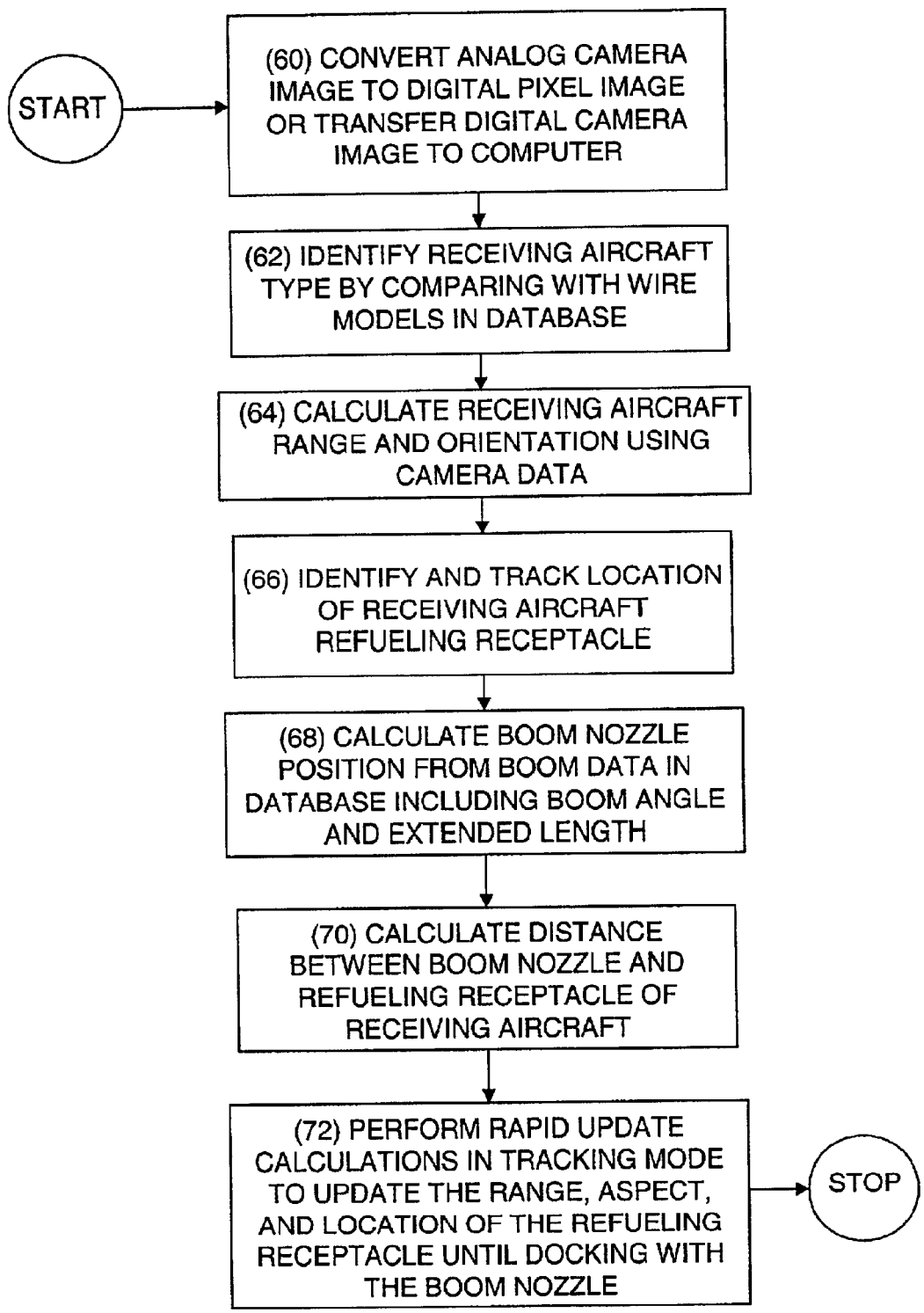
FIG. 4 is a block diagram of the step sequence for processing the data and commands of the present invention.

Referring to FIG. 4, a block diagram of the processing steps required for the computer to convert the camera images to coordinate data and identify the distance between the receiving aircraft refueling receptacle to the refueling aircraft boom nozzle is shown. In a first step 60 the camera image (if an analog image) is first converted to a digital pixel image, or if the camera is a digital camera, the digital camera images are relayed for direct use by the computer. In a second step 62, the received camera image is compared to the wire-models in the computer database to identify the type of receiving aircraft. In a third step 64, using the known data of the receiving aircraft wire-model, a receiving aircraft range and orientation are calculated using the camera data. In a fourth step 66, the known location of the receiving aircraft refueling receptacle based on the wire-model data and the camera data are identified and tracked. In a fifth step 68, based on the angle θ formed between the refueling boom and the refueling aircraft, the boom nozzle position is determined by the computer. Sensors known in the art are commonly located on the refueling aircraft to identify information such as the fully extended length of the refueling boom, the boom angle, and the azimuth of the boom nozzle.

In a sixth step 70, the distance between the boom nozzle position and the refueling receptacle of the receiving aircraft is calculated from the above data. This distance information is relayed to the boom operator typically on a viewing screen. In a seventh step 72, rapid update calculations are performed in a tracking mode to continuously update the range, aspect and location of the refueling receptacle, and thereby the distance information until the boom nozzle docks with the refueling receptacle.

Figure 5:
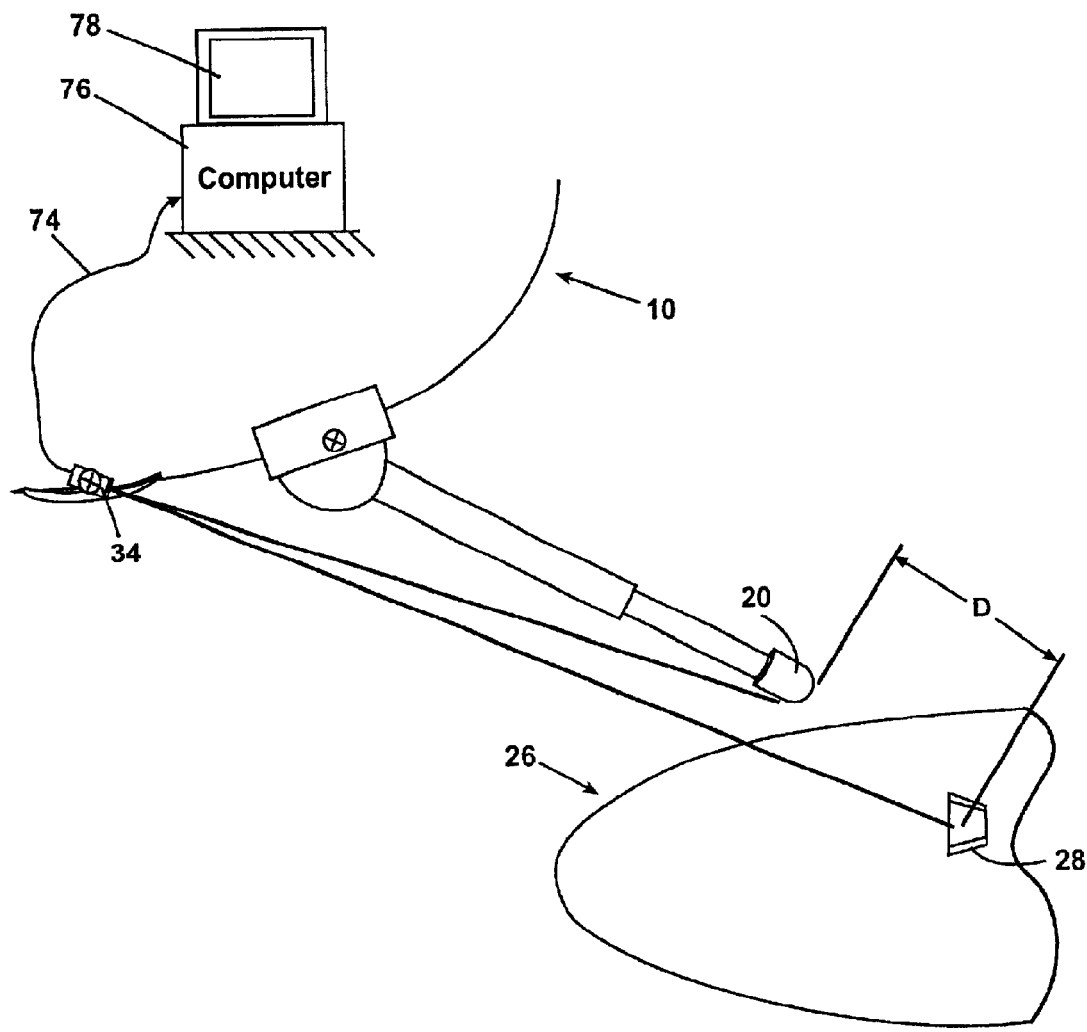
FIG. 5 is a perspective view showing an exemplary distance measurement between a refueling aircraft and a receiving nozzle of a receiving aircraft using a distance measuring system of the present invention.

Referring now to FIG. 5, the perspective view of FIG. 2 is further detailed. The digital images received by the camera 34 are transmitted by a data transmission line 74 to a computer 76. The computer 76 provides the necessary database and look-up tables for information including the refueling boom length B and the position of the refueling boom nozzle 20. A display screen 78 in communication with the computer 76 provides a visual read-out of the separation distance D between the refueling boom nozzle 20 and the refueling receptacle 28 of the receiving aircraft 26. The display screen 78 or a separate viewing screen (not shown) also provides a live visual indication of the relative position between the boom nozzle 20 and the refueling receptacle 28 allowing the boom operator to visually discern the relative distance between the boom nozzle 20 and the refueling receptacle 28.

Because a computer generated three-dimensional model of the refueling receptacle is available, it is also possible to enhance the image of the refueling receptacle of the receiving aircraft on the display screen 78 available to the boom operator. The enhanced image of the refueling receptacle 28 will aid the refueling boom operator during a low-light or nighttime refueling operation. With modifications to the refueling boom control system (not shown) currently installed on refueling aircraft, the distance measuring system of the present invention also permits an automatic control of the boom nozzle location such that the refueling boom can be automatically flown to the refueling receptacle of the receiving aircraft.

The distance measuring system of the present invention offers several advantages. Using the pre-loaded three-dimensional wire-models of various receiving aircraft, the computer 74 analyzes the images of the receiving aircraft 26 as it approaches to identify the coordinates of the refueling receptacle 28 for the specific type of receiving aircraft 26. By using existing sensors, known data of the refueling boom location, length and angle, and a pixel image from a camera 34, an X,Y,Z coordinate location can be generated for the boom nozzle 20. The same camera 34 provides an image reducible to a pixel image of the receiving aircraft 26 and its refueling receptacle 28. From coordinates assigned to each pixel image, a distance D between the boom nozzle 20 and the refueling receptacle 28 is calculated. Providing the boom operator with a distance measure which is continuously upgraded by the computer permits the boom operator to "fly" the refueling boom to the receiving aircraft, reducing the potential to damage the receiving aircraft 26 or the refueling boom 14. The distance measuring system of the present invention uses passive visual images received by one or more cameras on the refueling aircraft as an alternative to more expensive distance measuring systems commonly known.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An aircraft refueling boom distance measuring system comprising:
   at least one refueling boom adapted to be supported from a refueling aircraft;
   at least one camera installed on said refueling aircraft;
   a computer installed on said refueling aircraft;
   each said refueling boom having a boom nozzle;
   said boom nozzle being connectable with a receiving aircraft refueling receptacle;
   a mounting location of each said camera on said refueling aircraft operably providing a simultaneous line-of-sight view of both said boom nozzle and said refueling receptacle to said camera;
   each said camera operably receiving a plurality of boom nozzle images and a plurality of refueling receptable images along said line-of-sight view; and
   wherein said computer operably receives each of said boom nozzle and said refueling receptacle images for analysis to extrapolate therefrom a distance between said boom nozzle and said refueling receptacle.

2. The system of claim 1, further comprising:
   said refueling boom having an attachment end for attachment of said refueling boom to said refueling aircraft; and
   said attachment end forming a fixed reference point between said attachment end and said refueling aircraft.

3. The system of claim 2, wherein said boom nozzle and said fixed reference point are separated by a predetermined distance.

4. The system of claim 3, wherein said at least one camera is fixedly mounted to said refueling aircraft forming a camera reference point.

5. The system of claim 4, wherein said receiving aircraft refueling receptacle further comprises a coordinate set.

6. The system of claim 5, wherein said fixed reference point, said camera reference point, said predetermined distance and said coordinate set each form a plurality of coordinates retrievable by said computer to analyze said distance between said boom nozzle and said refueling receptacle.

7. The system of claim 6, further comprising:
said computer further including a data table and a conversion program to convert each of said plurality of images to one of a plurality of pixel images;
said data table storing a plurality of refueling receptacle geometries; and
each of said geometries forming one of a plurality of reference refueling receptacles for comparison by said computer to each of said plurality of pixel images usable by said computer to analyze said distance between said boom nozzle and said refueling receptacle.

8. The system of claim 7, wherein each of said geometries is selectable by an operator of said computer.

9. A method to measure a distance between an aircraft refueling boom and a receiving aircraft comprising the steps of:
installing a refueling boom having a boom nozzle, at least one camera and a computer on a refueling aircraft;
steering said boom nozzle towards a connection with a refueling receptacle of one of a plurality of receiving aircraft;
simultaneously viewing line-of-sight images of both said boom nozzle and said refueling receptacle with said camera;
creating a plurality of images of both said boom nozzle and said refueling receptacle with said camera; and
using said computer to calculate a distance between said boom nozzle and said refueling receptacle using said images.

10. The method of claim 9, further comprising the step of using said computer to convert each of said images to one of a plurality of pixel images of both said boom nozzle and said refueling receptacle.

11. The method of claim 10, further comprising the steps of:
fixing a connection location for each of said refueling boom and each digital camera on said refueling aircraft; and
inputting said refueling boom connection location and each said digital camera connection location as a set of reference points in said computer.

12. The method of claim 11, further comprising the steps of:
measuring an extended boom length;
loading a data table in said computer having said boom length stored therein; and
storing a plurality of refueling receptacle geometries for each of said plurality of receiving aircraft in said data table.

13. The method of claim 12, further comprising the step of selecting one of said receiving aircraft refueling receptacle geometries as a reference receptacle from said data table.

14. The method of claim 13, further comprising the steps of:
assigning a plurality of pixel coordinates to each of said pixel images; and
identifying a number of pixels in each pixel image.

15. The method of claim 14, further comprising the step of analyzing said distance between said boom nozzle and said refueling receptacle from said pixel coordinates, said number of pixels in each image, said reference points and said reference receptacle.

16. The method of claim 15, further comprising the step of displaying said distance between said boom nozzle and said refueling receptacle on a display screen.

17. The method of claim 16, further comprising the steps of:
storing each of said plurality of receiving aircraft as one of a plurality of three dimensional wire-models in said database;
loading a plurality of both aspects and ranges of each of said plurality of wire-models in said database;
identifying a location of said receiving aircraft from said pixel images and said plurality of both aspects and possible ranges; and
updating each of said plurality of both aspects and possible ranges in a tracking mode.

18. A method to control a refueling procedure between a refueling aircraft and a receiving aircraft, the refueling aircraft having a refueling boom including a boom nozzle, at least one camera and a computer, the method comprising:
simultaneously viewing line-of-sight images of both the boom nozzle and a refueling receptacle of the receiving aircraft with the camera;
creating a plurality of images of both the boom nozzle and the refueling receptacle with the camera;
calculating a distance between the boom nozzle and the refueling receptacle using the images;
continuously correcting the distance by performance of multiple update calculations as the distance changes over time; and
directing the boom nozzle to the refueling receptacle using the calculated distance.

19. The method of claim 18, comprising automatically flying the boom nozzle to the refueling receptacle using the computer.

20. A refueling system, comprising:
a refueling boom supported from a refueling aircraft, the refueling boom having a boom nozzle;
a receiving aircraft refueling receptacle operably connectable with the boom nozzle;
a camera installed on the refueling aircraft;
a computer in communication with both the camera and the refueling boom;
a camera orientation operably providing both a boom nozzle line-of-sight image and a refueling receptacle line-of-sight image;
a plurality of digital images of both said boom nozzle line-of-sight image and said refueling receptacle line-of-sight image operably formed by the camera; and
a calculated distance between the boom nozzle and the refueling receptacle extrapolated by the computer from the digital images;
wherein in an automatic mode the computer is operable to fly the refueling boom to the refueling receptacle using the calculated distance.

* * * * *